M. KANE.

HARVESTER ELEVATOR.

No. 11,447. Reissued Oct. 16, 1894.

Witnesses
Wm J. Fleming
James D. Ferry

Inventor
Maurice Kane
by Frank T. Bowen Atty.

UNITED STATES PATENT OFFICE.

MAURICE KANE, OF AUSTIN, ILLINOIS, ASSIGNOR TO THE WARDER, BUSHNELL & GLESSNER COMPANY, OF SPRINGFIELD, OHIO, AND CHICAGO, ILLINOIS.

HARVESTER-ELEVATOR.

SPECIFICATION forming part of Reissued Letters Patent No. 11,447, dated October 16, 1894.

Original No. 499,169, dated June 6, 1893. Application for reissue filed December 29, 1893. Serial No. 495,130.

*To all whom it may concern:*

Be it known that I, MAURICE KANE, a citizen of the United States, residing at Austin, in the county of Cook and State of Illinois, have invented certain new and useful Improvements in a Harvester-Elevator, which are fully set forth in the following specification, reference being had to the accompanying drawings, forming a part thereof.

The invention is designed to afford an improved means for delivering the grain from a platform carrier at the grain side of the drive wheel of the harvester to a binder upon the opposite side, with the least possible elevation and the least possible vertical extent of the mechanism for that purpose.

Figure 3:
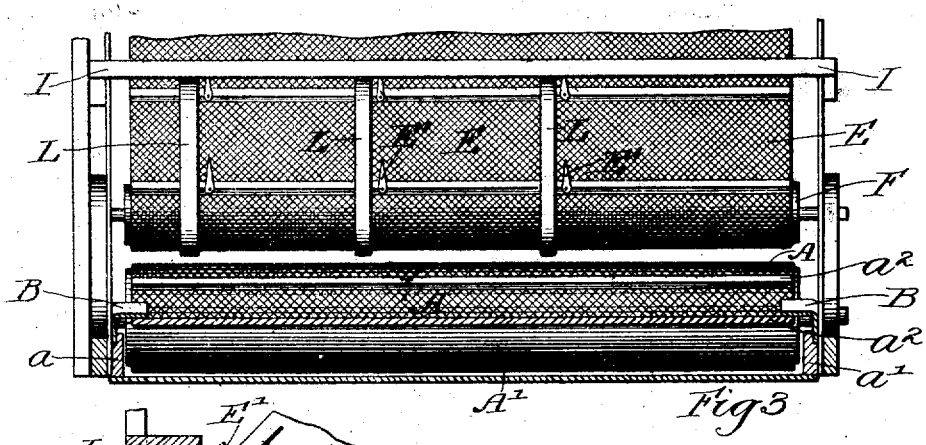
Figure 2:
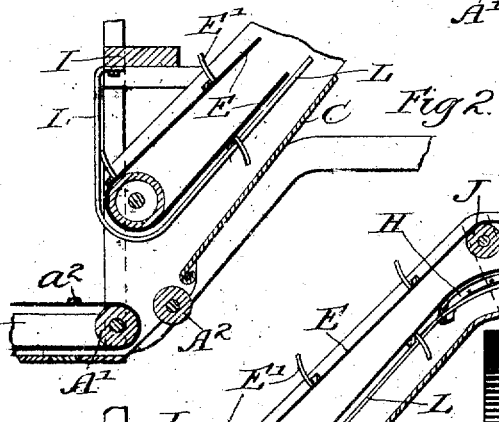
Figure 1:
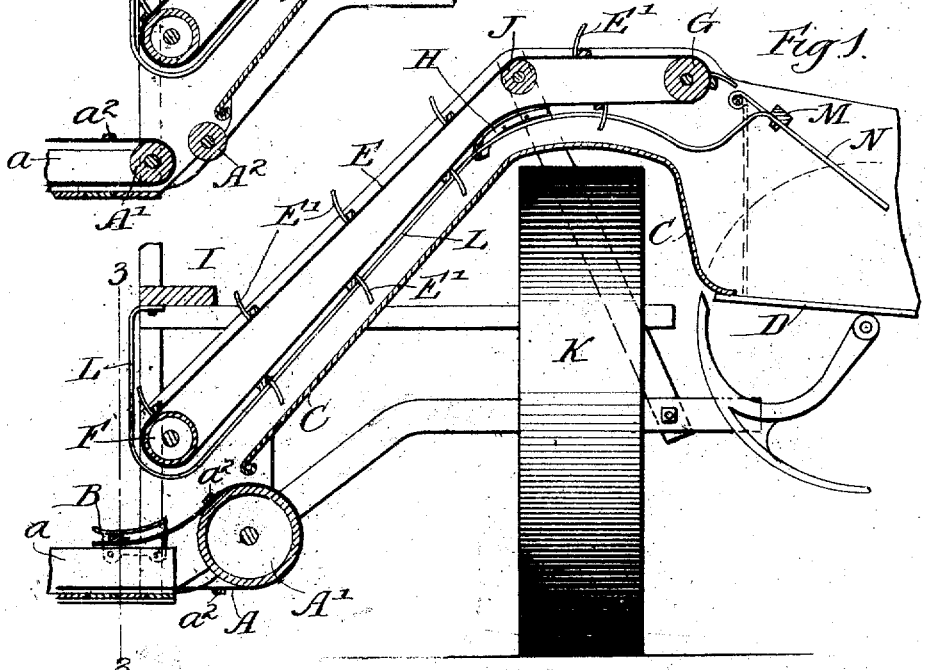

In the drawings, Figure 1 is a transverse vertical section showing conventionally, and in relative position the drive wheel of a harvester and certain portions of the frame, the stubbleward end of the platform conveyer, the gainward end of the binder deck and the binding arm, and showing, in detail, the construction of the elevator and devices at the delivery side of the platform conveyer which constitute my invention. Fig. 2 is a detail sectional view of the delivery side of the platform conveyer and receiving side of the elevator, showing a slight modification with respect to the platform conveyer delivering mechanism. Fig. 3 is a detail sectional elevation of the devices shown in Fig. 1, section being made at the line 3—3, the view being taken looking stubbleward.

A is the platform conveyer apron or canvas. A′ is its driving roller at the delivering side. In Fig. 1, I have shown a large driving roller, whose upper side is above the level of the carrying surface of the apron the latter being held to the level at which it is designed to travel over the platform by shoes B B, secured to the front and rear sills $a$, $a'$ and overhanging the edges of the apron, so as to engage the stiffening slats $a^2$ thereon as the apron moves toward the discharge side, the grainward end of the shoe being upturned, as seen in Fig. 1, to insure the entrance of the slats under the shoe as the apron moves. In Fig. 2, the driving roller A′ is shown of less size, not requiring the shoes, but located farther grainward than the larger roller of Fig. 1, and being supplemented by a clearing or delivering roller $A^2$, parallel with the roller A′, and just grainward therefrom. When the larger roller A′ is employed, it is preferably located considerable grainward from the vertical line of the driving roller of the elevator apron, so that said driving roller overhangs the shoes and the portion of the platform carrier apron which is inclined in the passage from the lower level of the carrier to the higher level of the upper side of the large roller A′. Whichever form of device is employed at the delivery side of the platform carrier, I provide, to receive the grain therefrom, whether delivered directly by the apron passing over the larger roller A′ or by the small roller $A^2$, taking the grain from the platform carrier, the deck C, which extends in an upwardly inclined direction to the top of the drive wheel and over the same as close thereto as possible without interfering with the proper adjustment of the machine on the drive wheel, and thence down at the stubbleward side of the wheel to the binder deck D. In order to carry the grain up this inclined deck and on over the wheel, and cause it to be delivered therefrom onto the binder deck, I provide an endless carrier E, which I prefer to make in the form of an apron passing over a driving roller F, at the lower inner side, said driving roller and the receiving end of the carrier, therefor, overhanging the platform carrier, and being located somewhat grainward from the point where the grain is delivered therefrom onto the fixed inclined deck C. When the platform carrier apron is extended stubbleward so that the grain is delivered therefrom directly onto the deck C, the stubbleward roller of said apron is located, as seen in Fig. 1, considerably stubbleward of the vertical line of the receiving end of the elevator endless carrier and its driving roller F, and when the apron is restrained by the shoe B, as shown in Fig. 1, I prefer to have the said driving roller of the elevator and the receiving end of the latter overhang the upwardly concave portion of the platform carrier apron, which extends from the horizontal portion up to the upper side of the large driving roller A′ of said platform carrier. In a similar manner, when a clearing roller $A^2$ is employed to supplement a platform carrier, which is horizontal and without the up-rise at the delivery side caused by the larger roller, I prefer to have the elevator receiving end and driving roller overhang the corresponding space between the horizontal platform carrier and the receiving end of the deck C. At the upper and delivery side, the endless elevator carrier E passes around the roller G, which is located stubbleward from the vertical fore-and-aft plane of the drive wheel K, the upwardly moving and grain actuating ply of the carrier E being deflected by shoes H, H, secured to the elevator frame and operating similarly to the shoes B, B, provided for the platform carrier in the form shown in Fig. 1, and tending to deflect the grain-actuating ply of the endless carrier upward, forming a downwardly open obtuse bend at about the vertical plane of the grainward side of the drive wheel; and, to retain the return ply of the carrier in a corresponding position and prevent it from dragging on the lower grain-actuating ply I provide the idle roller J, suitably journaled in the frame at such position above the grain-actuating ply, and near the vertical plane of the grainward side of the drive wheel, as to permit the grain actuating ply to be forced up as far as necessary by the grain which is carried by said ply to give it throat room or opportunity for passage over the wheel toward the binder. As I prefer to construct the elevating mechanism, however, the grain-actuating ply is not liable to be forced very much out of what may be considered its normal position on the shoes H, for I prefer to employ stripping bands L L L, which may be strips of sheet metal having their ends at the grainward side of the elevator secured to the seat plank I, and extending around underneath the driving roller F of the elevator endless carrier and therefrom substantially parallel with the deck C in the inclined direction of that deck, and over the portion of said deck which overhangs the drive wheel, leaving a throat or avenue of approximately uniform width to a point about in the vertical plane of the farther side of the drive wheel or a little beyond it, and from that point being deflected upward away from the deck C, but still away from the endless carrier E in close proximity to which the strippers have extended throughout the upwardly inclined portion of their course grainward from the wheel, and the approximately horizontal portion above the wheel, and from which they now diverge in order that the carrying teeth E′ E′, &c., with which the endless carrier of the apron is provided may be stripped before they pass over the outer roller G. The stubbleward and upper ends of the strippers L may be secured to a transverse bar M, which is located at the stubbleward side of the wheel beyond the roller G, and overhanging the binder deck D. The usual floating fingers N, secured at any convenient point stubbleward from the elevator carrier, serve to check the grain on the binder deck D, so that as it is delivered by the carrier from the widening mouth formed between the deck C, diverging rapidly downward, and the strippers L diverging upward is accumulated under and against such floating fingers, the latter being forced outward and upward as the quantity of accumulated grain increases, the grain being thus retained in reach of the binding arm. This construction requires the minimum extent of any devices above the top of the drive wheel, and permits the location of the binder deck far enough below the top of the drive wheel to allow the grain a sufficient fall to very materially assist in straightening it, and causing it to be accumulated in good condition for the action of the binder.

The shoes H may be omitted and such omission will not materially affect the action of the device, provided in that case that the strippers L are sufficiently rigid to uphold the endless carrier at the point where it should be deflected above the drive wheel, but the shoes and strippers co-operate in a desirable manner and I prefer to use them both.

What I claim as new, and desire to secure by Letters Patent, is—

1. In a grain harvester, the combination with the platform carrier at the grainward side of the drive wheel and the binder deck at the stubbleward side; a continuous deck extending from the delivery side of the platform carrier in an upwardly inclined direction to a point above the drive wheel; thence substantially horizontally above the latter to its stubbleward side, and thence downwardly at the stubbleward side of the drive wheel to the binder deck; and an endless carrier overhanging the portion of said deck at the grainward side of and above the wheel; substantially as set forth.

2. In a grain harvester, in combination with a platform carrier at the grainward side of the drive wheel and the binder deck at the stubbleward side, a fixed deck extending from the delivery side of the platform carrier to the receiving side of the binder deck, and deflected toward horizontal position at the grainward side of the drive wheel, and again deflected downward at the stubbleward side of the drive wheel; an endless carrier operating above the portion of said deck located grainward of the drive wheel and having its delivery side at a vertical plane stubbleward of the drive wheel, and deflected upward out of the direct plane between its receiving and delivery sides substantially at the vertical plane of the said deflection of said fixed deck toward horizontal position; substantially as set forth.

3. In a grain harvester, in combination with the platform carrier at the grainward side of the drive wheel and the binder deck at the stubbleward side, a continuous deck extending from the delivery side of the platform carrier to the receiving side of the binder deck; an endless carrier overhanging at its receiving side the delivery side of the platform carrier, and having its delivery side at a vertical plane stubbleward of the drive wheel and having its upper ply deflected upward and its lower ply free to yield upward out of the direct plane between its receiving and delivery sides substantially at a distance grainward from the delivery side roller; substantially as set forth.

4. In a grain harvester in combination with the platform carrier at the grainward side of the drive wheel, having its roller at the delivery side of large diameter relatively to the distance between the upper and lower ply of the carrier throughout its principal extent and having shoes B B, about which the grain-actuating ply of the carrier is deflected as it passes onto said roller; an elevator endless carrier having its receiving side and the operating roller at that side overhanging the said deflected portion of the platform carrier; substantially as set forth.

5. In a grain harvester, the combination with a drive wheel, of a mechanism for feeding the grain over the same, comprising a lower suitable support for such grain and an upper apron supported by the usual lower and upper rollers and having an additional support for the return ply of such apron located under the said ply but above the ordinary path thereof, whereby the return ply is deflected and prevented from dragging on the lower ply when the latter is lifted by the passage of the grain; substantially as and for the purpose set forth.

6. In a grain harvester, the combination with a drive wheel, a platform carrier at the grainward side and a binder deck at the stubbleward side thereof, a suitable support for the grain between such carrier and binder deck and an upper elevator apron provided with the usual upper and lower rolls and an additional or third roller located under the return ply above the ordinary path thereof, whereby said ply is deflected upward so as to give the grain throat room for passage over the wheel toward the binder; substantially as set forth.

7. In a harvester the combination of a drive wheel, a lower suitable support for the grain, and an upper feeding apron extending from the vicinity of the platform carrier to, above, and substantially across the top of the drive wheel and provided with a support for the return ply of such apron located approximately above such drive wheel; substantially as and for the purpose set forth.

In testimony whereof I have hereunto set my hand, in the presence of two witnesses, this 27th day of December, 1893.

MAURICE KANE.

Witnesses:

FRANK T. BROWN,

J. LAWRENCE GERRY.